(12) United States Patent
Drew

(10) Patent No.: US 6,415,682 B1
(45) Date of Patent: Jul. 9, 2002

(54) PEDAL ASSEMBLY WITH WEDGE FASTENER

(75) Inventor: George R. Drew, Vancouver, WA (US)

(73) Assignee: Freightliner LLC, Portland, OR (US)

( * ) Notice: Subject to any disclaimer, the term of this patent is extended or adjusted under 35 U.S.C. 154(b) by 0 days.

(21) Appl. No.: 09/422,883

(22) Filed: Oct. 21, 1999

(51) Int. Cl.⁷ ................................................ G05G 1/14
(52) U.S. Cl. ............................ 74/513; 74/512; 74/560; 74/562
(58) Field of Search .................... 74/512, 513, 560; 403/365, 367, 368, 370

(56) References Cited

U.S. PATENT DOCUMENTS

| | | | | |
|---|---|---|---|---|
| 622,644 A | * | 4/1899 | Annable ..................... | 74/560 |
| 627,597 A | * | 6/1899 | Scott .......................... | 74/560 |
| 3,503,638 A | | 3/1970 | Hözel | |
| 3,841,771 A | | 10/1974 | Shankwitz et al. | |
| 4,022,536 A | | 5/1977 | Piepho et al. | |
| 4,186,570 A | | 2/1980 | Pokrandt | |
| 4,358,967 A | * | 11/1982 | Kastan ...................... | 74/594.2 |
| 4,702,635 A | * | 10/1987 | Mullenberg ................. | 403/15 |
| 5,810,504 A | | 9/1998 | Rabinovich | |
| 5,829,317 A | * | 11/1998 | Vreekan et al. ............... | 74/560 |
| 5,927,154 A | * | 7/1999 | Elton et al. .................... | 74/512 |

* cited by examiner

Primary Examiner—David A. Bucci
Assistant Examiner—Vicky A. Johnson
(74) Attorney, Agent, or Firm—Klarquist Sparkman LLP

(57) ABSTRACT

A pedal assembly includes a shaft having a pedal mounting end portion. A pedal with a shaft mounting end portion is coupled to the shaft. At least one wedge slidably engages the pedal mounting end portion and the shaft mounting end portion to couple the pedal to the shaft so that the pedal and shaft move together while resisting relative rotation. The shaft may include first and second interconnected shaft sections with one of the shaft sections being hollow. The shaft mounting end portion of the pedal may comprise a collar having an axially extending bore with at least one bore flat, and in one specific form, first and second opposed bore flats. The pedal mounting end portion of the shaft may have at least one shaft flat and in a specific form has a pair of opposed shaft flats. When assembled, the shaft flats are aligned with the bore flats. The wedge may be a u-shaped wedge structure with first and second wedge shaped legs that are inserted into respective gaps between the bore flats and shaft flats. A fastener, which may be biased to resist movement as a result of vibration, may be used to hold the wedge structure in place.

12 Claims, 1 Drawing Sheet

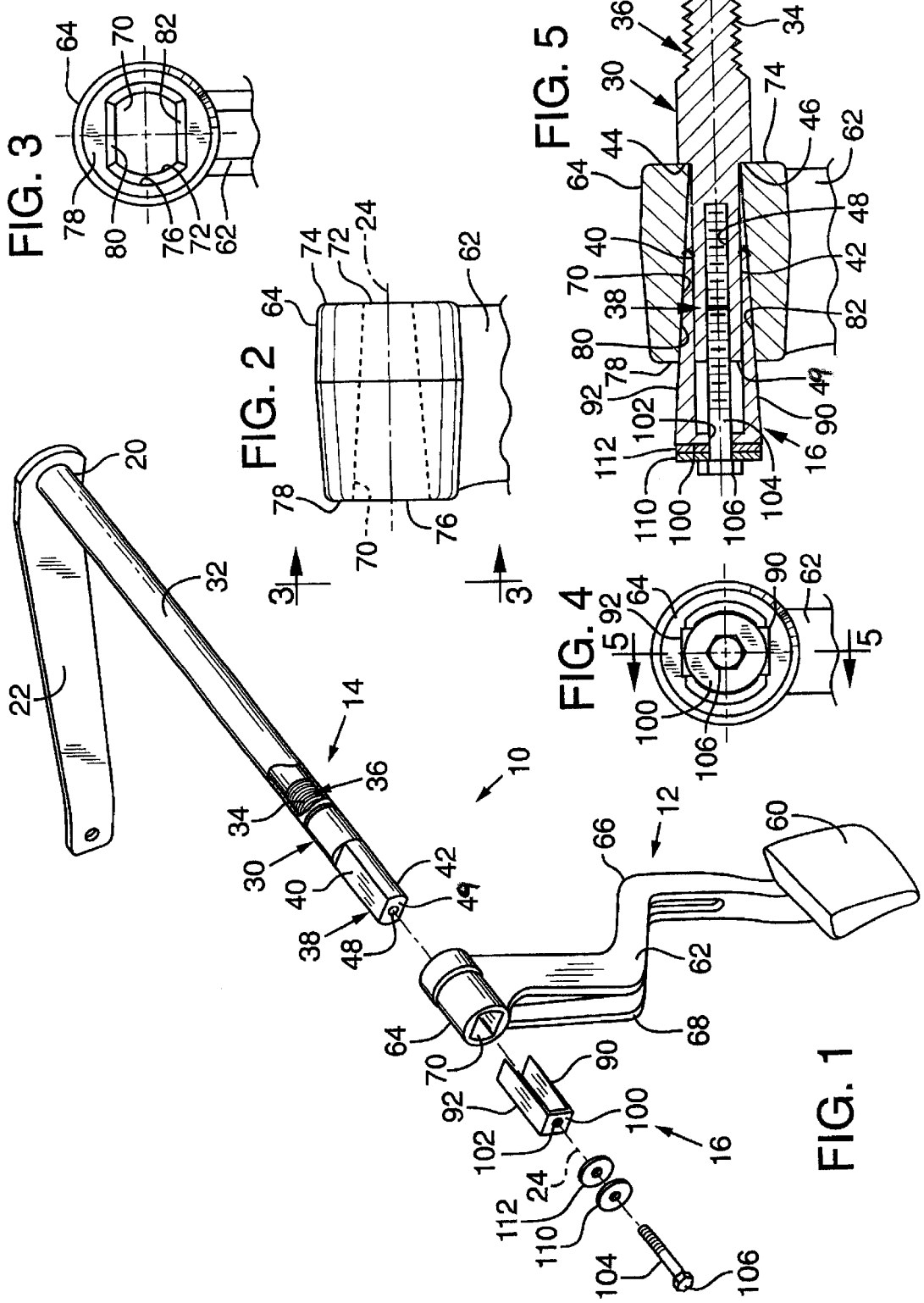

PEDAL ASSEMBLY WITH WEDGE FASTENER

BACKGROUND

The present invention relates to a wedge fastener for securing a pedal to a shaft, such as, for example, a vehicle clutch pedal and to the resulting pedal assembly.

It is known in the art that a clutch pedal may be secured to a shaft using a key and keyway combination. In this known design, a keyway is provided at the end of the shaft and also inside the hub portion of the clutch pedal. These keyways are aligned with a key which is driven into the keyways to hold the clutch pedal onto the shaft. This type of assembly requires significant machining and it is difficult to disassemble for repair. As another known approach, the hub of a clutch pedal is placed on a clutch shaft and a pinch bolt is positioned in the hub and tightened to expand the hub against the clutch shaft.

SUMMARY

In accordance with one embodiment, a pedal structure has a foot engaging end portion with a foot pedal spaced from a shaft mounting end portion. A pedal mounting end portion of a shaft of a pedal assembly is coupled to the shaft mounting end portion of the pedal structure. At least one wedge slidably engages the pedal mounting end portion of the shaft and the shaft mounting end portion of the pedal structure so that the shaft and the pedal move together while resisting relative rotation.

The shaft may include first and second interconnected shaft sections with the first shaft section including the pedal mounting end portion. The second shaft section may have a hollow interior. In this case, the first shaft section may have a mounting or coupling end portion opposite to the pedal mounting end portion which is inserted into the hollow interior of the second shaft section.

The pedal mounting end portion of the shaft may have at least one wedge engaging shaft flat. In addition, the shaft mounting end portion of the pedal structure may comprise a collar having an axially extending bore. The bore may include at least one wedge engaging bore flat which is aligned with the at least one shaft flat upon insertion of the pedal mounting end portion of the shaft into the bore. In this specific embodiment, the at least one wedge engages the at least one bore flat and at least one shaft flat to couple the pedal to the shaft.

The bore flat may diverge away from the centerline of the bore from one end to the other of the bore so as to provide a tapered receiving opening for the at least one wedge. The wedge may be tapered to compliment the tapered shape of the bore flat.

As a further aspect of one embodiment, the pedal mounting end portion of the shaft may have two opposed shaft flats with the bore having two opposing bore flats positioned to correspond to the shaft flats when the pedal structure is mounted to the pedal mounting end portion of the shaft. The at least one wedge may comprise a wedge structure having a plurality of wedge portions, such as two tapered leg wedge portions each being inserted between a respective shaft flat and a respective bore flat. The wedge structure may be of a u-shaped construction with the leg portions extending outwardly from a base portion of the wedge structure.

The pedal of the pedal assembly may be a clutch pedal.

At least one fastener may be used to secure the pedal assembly together. In one form, the pedal mounting end portion of the shaft has an axially extending threaded bore and the at least one fastener comprises a threaded bolt. The bolt may be inserted through the at least one wedge and threaded into the threaded bore. At least one biasing element, such as a spring, which may comprise first and second cupped washers, may be positioned between the bolt head and the wedge structure, or at another suitable location, to apply a biasing force to the fastener to minimize the possibility of the fastener becoming loose, such as a result of vibrations.

The present invention is directed toward novel and unobvious features of a pedal assembly, both alone and in combination with one another. The above and additional features of the present invention will become apparent from the following description.

BRIEF DESCRIPTION OF THE DRAWINGS

FIG. 1 is an exploded view of one embodiment of a pedal assembly.

FIG. 2 is a side view of a collar portion of the pedal assembly of FIG. 1.

FIG. 3 illustrates an end view of the collar portion of FIG. 2, taken in the direction of arrows 3—3 in FIG. 2.

FIG. 4 illustrates an end view of the collar portion of the pedal assembly of FIG. 1 when fully assembled.

FIG. 5 is a cross sectional view of the pedal assembly of FIG. 4, taken along line 5—5 of FIG. 4.

DETAILED DESCRIPTION

With reference to FIG. 1, one form of a pedal assembly in accordance with the present invention is indicated at 10. The illustrated pedal assembly includes a pedal or pedal structure 12, such as a brake pedal or clutch pedal, a shaft or shaft assembly such as indicated at 14, and at least one wedge, such as indicated at 16, which may include a plurality of wedging elements, for coupling the pedal structure 12 to the shaft 14.

In the form shown in FIG. 1, the shaft 14 has a first end portion 20 which is press fit, threaded into, or otherwise coupled to a link 22. The link 22 is coupled to a brake or clutch actuating assembly in a conventional manner and allows the pedal structure 12, such as when mounted as described below, to move together with the shaft 14 about an axis indicated by a line 24, with the pedal structure 12 moving with the shaft 14. Relative motion between the pedal structure 12 and shaft 14 is prevented in this case.

The shaft 14 may comprise a single piece rod or tube. However, in the illustrated embodiment, shaft 14 includes first and second shaft sections 30, 32. The shaft section 32 in the illustrated form is hollow. Shaft section 32 includes a distal or outer end portion 34 spaced from the first end portion 20. The shaft section 30 includes a pedal mounting end portion 38 to which the pedal structure 12 is mounted when the assembly is complete. In addition, shaft section 30 includes a coupling end portion 36 which is coupled to the outer end portion 34 of shaft section 32. In the illustrated embodiment, the interior of end portion 34 of shaft 32 is threaded and the exterior of the shaft end portion 36 is correspondingly threaded. Consequently, the end portion 36 may be threaded into the end portion 34 with shaft section 30 then being tightened to join these elements together. Alternatively, shaft section 30 may be press fit or otherwise coupled to shaft section 32.

As is apparent from FIGS. 1 and 5, the pedal mounting end portion 38 the shaft section 30 includes at least one flat 40 and in the illustrated embodiment includes a pair of opposed flats 40, 42. Respective shoulders or stops 44, 46 are provided in shaft section 30 at the location where the flats commence. An axially extending bore 48 extends into the shaft section 30 from a distal end surface 49 of the shaft section. Bore 48 is aligned with the axis 24 and may be threaded internally to receive a fastener as described below.

The illustrated example of pedal structure 12, referring to FIG. 1, includes a foot pedal engaging portion with a foot pedal 60, a central portion 62 and a collar portion 64 spaced from the foot pedal 60. The central portion 62 may have a pair of right angled bends indicated generally at 66, 68 as shown, or may be otherwise configured. The collar 64 comprises one form of a shaft mounting end portion, although other forms may be used. In the illustrated embodiment, collar 64 includes an axially extending bore 70 extending between a first opening 72 located in a first end surface 74 of the collar and a second opening 76 located in the opposing end surface 78 of the collar. As best seen in FIGS. 2 and 5, the illustrated bore 70 is tapered moving in a direction from end surface 78 toward end surface 74. In addition, as can be seen in FIG. 3, the bore is formed with at least one flat, in this case, upper and lower flats 80, 82 rather than being of a circular configuration. When the end portion 38 of shaft section 30 is inserted into the bore 70 (see FIG. 5) the illustrated configuration orients the shaft flats 40, 42 in alignment (in a complimentary relationship) with the bore flats. Consequently, the space between the bore flats and shaft flats is generally wedge shaped. That is, a greater space is provided at collar end 78 than at collar end 74. Although advantageous, the flats need not be perfectly flat as they may include projections or other surface features which mate with the wedge elements or be otherwise configured and positioned in the collar 64.

With reference to FIG. 5, the illustrated wedge structure 16, although it may comprise a single wedge, in the illustrated embodiment comprises first and second wedge portions 90, 92 which are respectively inserted in the gaps between shaft flat 40 and bore flat 80 and shaft flat 42 and bore flat 82. Although not required, the illustrated wedge structure 16 has first and second legs comprising the wedge portions 90, 92 with portions 90, 92 interconnected by a base 100. In the specific construction shown, wedge structure 16 is generally of a unshaped configuration. An opening 102 is provided through the base 100 of this illustrated wedge structure. A fastener 104, in this case a bolt having a threaded shank and bolt head 106, is inserted through the opening 102 with the shank being threaded into the interior of the opening 48. As the bolt 104 is tightened, the wedge 90, 92 are driven further into the wedge receiving gaps. Eventually, the interior of the base 100 approaches the collar end surface 46 and reaches a substantially abutting position. A biasing mechanism may be included to apply tensioning force to the wedge and/or fastener to minimize the possibility of the wedge and fastener working free of the assembly as a result of vibrations of the completed pedal assembly. In the illustrated embodiment, although springs or other biasing mechanisms may be used, first and second cupped washers 110, 112 oriented as shown in FIG. 5 may be used. As the bolt 104 is tightened, the bolt head 106 compresses the washers with the washers then applying a biasing force to the bolt when the assembly is complete.

Although the present invention has been described with reference to certain illustrated embodiments, other versions are possible. Therefore, the spirit and scope of the appended claims is not limited to the description of the embodiments contained herein.

I claim:
1. A pedal assembly comprising:
a shaft having a pedal mounting end portion;
a pedal having a shaft mounting end portion and a foot engaging end portion, said shaft mounting end portion being spaced from said foot engaging end portion;
said pedal mounting end portion being coupled to said shaft mounting end portion; and
at least one wedge slidably engaging said pedal mounting end portion and said shaft mounting end portion to couple said pedal to said shaft and to allow said shaft and said pedal to move together while resisting relative rotation;
wherein the shaft comprises first and second threadedly interconnected shaft sections, the first shaft section including said pedal mounting end portion; and
wherein said second shaft section has a threaded hollow interior; and said first shaft section has a threaded end portion opposite to the pedal mounting end portion which is threadedly inserted into the hollow interior of said second shaft section.

2. A pedal assembly comprising:
a shaft having a pedal mounting end portion;
a pedal having a shaft mounting end portion and a foot engaging end portion, said shaft mounting end portion being spaced from said foot engaging end portion;
said pedal mounting end portion being coupled to said shaft mounting end portion;
at least one wedge slidably engaging said pedal mounting end portion and said shaft mounting end portion to couple said pedal to said shaft and to allow said shaft and said pedal to move together while resisting relative rotation;
said pedal mounting end portion has at least one shaft flat;
said shaft mounting end portion comprising a collar having an axially extending bore with at least one bore flat which is aligned with said at least one shaft flat upon insertion of the pedal mounting end portion into the bore; and
wherein the at least one wedge engages the at least one bore flat and the at least one shaft flat to couple said pedal to said shaft.

3. The pedal assembly of claim 2, wherein
said bore extends between first and second bore openings, the first bore opening for receiving said pedal mounting end portion and the second opening for receiving said at least one wedge;
said at least one bore flat diverging outwardly from the centerline of the bore moving in a direction from the first bore opening to the second bore opening; and
at least one wedge being tapered to compliment the shape of said at least one bore flat.

4. The pedal assembly of claim 3, wherein
said pedal mounting end portion has two opposing shaft flats;
said bore has two opposing bore flats corresponding to said shaft flats; and
wherein the at least one wedge has two tapered leg portions, each leg portion being inserted between a respective shaft flat and a respective bore flat.

5. The pedal assembly of claim 4 wherein said at least one wedge comprises a u-shaped wedge.

6. The pedal assembly of claim 5 wherein the pedal is a clutch pedal.

7. A pedal assembly comprising:
a shaft having a pedal mounting end portion;
- a pedal having a shaft mounting end portion and a foot engaging end portion, said shaft mounting end portion being spaced from said foot engaging end portion;
- said pedal mounting end portion being coupled to said shaft mounting end portion;
- at least one wedge slidably engaging said pedal mounting end portion and said shaft mounting end portion to couple said pedal to said shaft and to allow said shaft and said pedal to move together while resisting relative rotation; and
- wherein the wedge is a unshaped wedge having first and second leg portions which slidably engage the pedal mounting end portion of the shaft and said shaft mounting end portion of the pedal.

8. A pedal assembly comprising:
a shaft having a pedal mounting end portion;
a pedal having a shaft mounting end portion and a foot engaging end portion, said shaft mounting end portion being spaced from said foot engaging end portion;
said pedal mounting end portion being coupled to said shaft mounting end portion;
at least one wedge slidably engaging said pedal mounting end portion and said shaft mounting end portion to couple said pedal to said shaft and to allow said shaft and said pedal to move together while resisting relative rotation; and
further comprising at least one fastener for securing said assembly.

9. The pedal assembly of claim 6, wherein said pedal mounting end portion has an axially extending threaded bore;
- said at least one fastener comprising a threaded bolt, said bolt being inserted through the at least one wedge and being threaded into said threaded bore; and
- at least one spring element positioned between the bolt head and said at least one wedge to minimize the possibility of said bolt becoming loose as a result of vibrations.

10. The wedge assembly of claim 9, wherein the at least one spring element comprises first and second cupped washers.

11. A pedal assembly comprising:
- a shaft comprising first and second interconnected shaft sections, the second section having a hollow interior, the first section having an end portion inserted into the hollow interior;
- the first section including a pedal mounting end portion, said pedal mounting end portion having at least one shaft flat and an axially extending threaded bore;
- a pedal having a shaft mounting end portion and a foot engaging end portion, said shaft mounting end portion comprising a collar having an axially extending bore with at least one bore flat which is aligned with said at least one shaft flat upon insertion of the shaft mounting end portion into the bore;
- said bore having a shaft receiving first opening and a wedge receiving second opening with the bore extending between the first and second openings, said at least one bore flat diverging from the centerline of the bore moving in a direction from the first opening to the second opening;
- at least one wedge slidably engaging the at least one bore flat and the at least one shaft flat to couple said pedal to said shaft, said at least one wedge tapering to compliment said at least one bore flat;
- a bolt having a head and a threaded shank for securing said assembly, said bolt being inserted through said at least one wedge and said shank being threaded into the threaded bore; and
- at least one cupped washer positioned between the bolt head and said collar to minimize the possibility of said bolt becoming loose as a result of vibrations.

12. The pedal assembly of claim 9 wherein said pedal is a clutch pedal.

* * * * *

UNITED STATES PATENT AND TRADEMARK OFFICE
CERTIFICATE OF CORRECTION

PATENT NO. : 6,415,682 B1
DATED : July 9, 2002
INVENTOR(S) : George R. Drew

It is certified that error appears in the above-identified patent and that said Letters Patent is hereby corrected as shown below:

Column 3,
Line 43, "a unshaped" should read -- a U-shaped --.

Column 5,
Line 13, "unshaped" should read -- U-shaped --.

Signed and Sealed this

Eighth Day of July, 2003

JAMES E. ROGAN
*Director of the United States Patent and Trademark Office*